Jan. 3, 1956                    T. D. BIRCHALL                    2,729,344
                        MACHINE FOR DISMOUNTING STACKS OF CANS
Filed Dec. 27, 1949                                              7 Sheets-Sheet 1

Inventor
THOMAS D. BIRCHALL,
By Hans G. Hoffmeister.
                Attorney Jan. 3, 1956 T. D. BIRCHALL 2,729,344
MACHINE FOR DISMOUNTING STACKS OF CANS
Filed Dec. 27, 1949 7 Sheets-Sheet 2

Inventor
THOMAS D. BIRCHALL
By Hans G. Hoffmeister.
Attorney

Jan. 3, 1956  T. D. BIRCHALL  2,729,344
MACHINE FOR DISMOUNTING STACKS OF CANS
Filed Dec. 27, 1949  7 Sheets-Sheet 3

Inventor
THOMAS D. BIRCHALL
By Hans G. Hoffmeister
Attorney

Jan. 3, 1956 T. D. BIRCHALL 2,729,344
MACHINE FOR DISMOUNTING STACKS OF CANS
Filed Dec. 27, 1949 7 Sheets-Sheet 4

Inventor
THOMAS D. BIRCHALL
By Hans G. Hoffmeister
Attorney

Jan. 3, 1956

T. D. BIRCHALL 2,729,344

MACHINE FOR DISMOUNTING STACKS OF CANS

Filed Dec. 27, 1949

FIG_6

FIG_8

Inventor
THOMAS D. BIRCHALL
By Hans G. Hoffmeister
Attorney

Jan. 3, 1956     T. D. BIRCHALL     2,729,344
MACHINE FOR DISMOUNTING STACKS OF CANS
Filed Dec. 27, 1949     7 Sheets-Sheet 7

Inventor
THOMAS D. BIRCHALL
By Hans G. Hoffmeister.
Attorney

United States Patent Office 2,729,344
Patented Jan. 3, 1956

2,729,344

MACHINE FOR DISMOUNTING STACKS OF CANS

Thomas D. Birchall, Turlock, Calif., assignor to G. W. Hume Company, Turlock, Calif., a corporation of California Application December 27, 1949, Serial No. 135,256

7 Claims. (Cl. 214—8.5)

The present invention relates to machines for dismounting stacks of food containing cans or like articles and aligning them into orderly rows for conveyance to processing machines, such as labelers. In the canning industry processed food containing cans are frequently stored in unlabeled condition until they are sold. For this purpose the cans are stacked in many superposed tiers upon suitable wooden foundations which are commonly known as pallets; and several such loaded pallets are usually stacked above one another to use the warehouse space from the floor to the ceiling. Then, when a lot of canned goods is sold, the requisite number of pallets is removed from the warehouse and the cans are fed into a labeling machine so that they may be provided with the labels of the particular purchaser before they are boxed and shipped out.

The manual unloading of the cans from the pallets to feed them into a labeling machine is a slow and expensive operation, and it is therefore an object of the present invention to provide industrial means for dismounting stacks of cans without involving manual handling of the cans.

Another object is to provide a machine adapted to dismount a stack of cans from a pallet and to align the cans into orderly columns for conveyance to a labeling machine or the like.

Still another object is to provide a machine of the type referred to that is easy to control and which is safe and dependable in operation.

In accordance with the invention I employ electromagnets mounted in a trolley or like carriage for lifting the cans in layers from the stack on the pallet and it is an object of the present invention to provide a magnetic structure for the purpose set forth that has an effective magnetic attraction surface of such size as to cover a total layer of cans.

Moreover, it is an object to provide a magnetic attraction area of such size as to cover a whole layer of cans which will dependably hold every single can in said layer irrespective of its position within said area.

Furthermore, it is an object to provide a magnetic structure composed of a plurality of adjacently positioned bar-shaped magnets arranged to present an attraction area which is of such size as to cover a whole layer of cans and which is adapted to dependably hold every single can in said layer without need for aligning the rows of cans comprised in said layer with the individual bars of the magnetic structure.

Additionally, it is an object to provide a magnetic attraction surface adapted, upon energization, to attract and hold a whole layer of cans, which is capable of adjusting itself automatically to the unevenness of the upper surface of a can layer such as may be caused by irregularities in the position of the individual cans, so that each single can may be brought fully into contact with said magnetic surface.

When a layer of cans has been attracted by the surface of a magnetic structure of the type referred to, it may then be transferred to another place such as a conveyor by rolling the trolley within which the magnetic structure is mounted, over said place and dropping the cans by de-energization of the attracting magnets. It is another object of this invention to provide means automatically effective to de-energize the magnets and thus cause them to release the cans whenever the trolley is properly positioned above the place to which the cans are to be transferred.

These and other objects of my invention will be apparent from the following description of the accompanying drawings which illustrate a preferred embodiment thereof and wherein:

Figures 2 and 3 represent the left and right halves, respectively, of a plan view of the complete machine;

Figures 4 and 5 represent the left and right halves of a vertical section through the machine taken along the lines 4—4 and 5—5 of Figures 2 and 3, respectively.

Figure 9 is a fragmentary bottom plan view of the magnetic surface formed by said bars illustrating different positions of attracted cans relatively to said bars.

Figures 1, 7, 8:
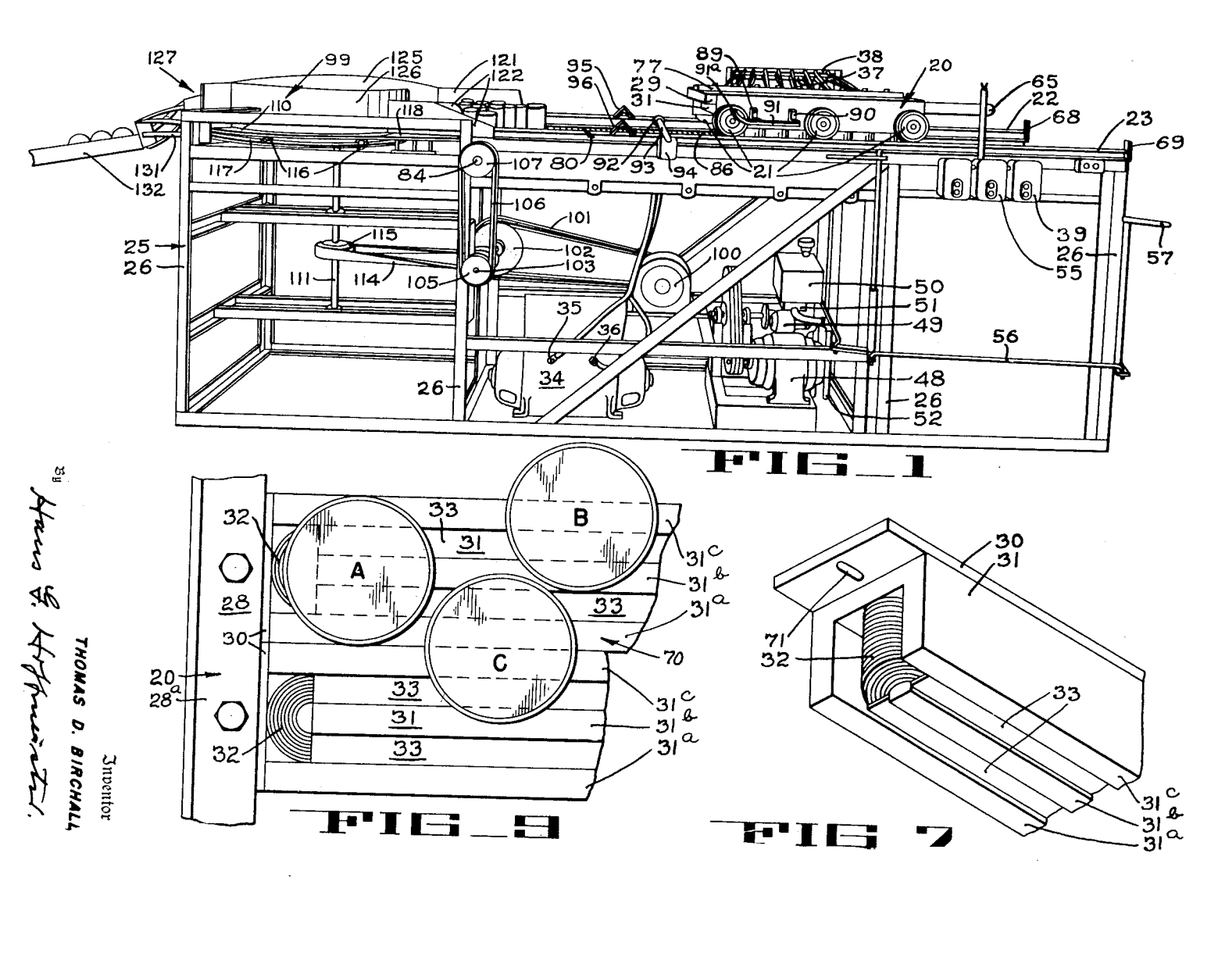
Figure 1 is a perspective view of the complete machine.
Figure 7 is a fragmentary perspective of one of the magnetic bars that are mounted in the trolley which forms part of the machine, as shown in Figures 1, 3, 5 and 6.
Figure 8 is a fragmentary cross section through the mounting mechanism for magnetic bars.

The machine of my invention comprises a trolley 20 having three pairs of wheels 21, as shown in Figures 1, 3, 5 and 6. Said wheels run on an elevated track formed by a pair of horizontally positioned rails 22 and 23 that are supported a distance above ground by means of a frame structure 25 comprising a plurality of uprights 26. Secured to the sides of said trolley internally thereof are two parallel angle bars 28 and 29 having inwardly directed horizontal flanges 28a and 29a, respectively, upon which rest a plurality of adjacently positioned bar-shaped carrier members 30. Secured to the underside of each of said carrier members 30 is a bar 31 of a suitable magnetizable material, such as soft iron. Each of said bars has a cross-sectional profile in the shape of a downwardly directed E so that three downwardly directed ribs or flanges 31a, 31b and 31c are formed, as best shown in Figures 5 and 7, and wound around the center flange 31b of each of said E-shaped bars is a magnetizing winding 32. Strips of a suitable insulating material 33 may be arranged to cover the longitudinal runs of said windings to protect said windings and also to prevent that cans may be caught with their rims in the spaces between the flanges 31a, 31b and 31c. To energize the magnets 31 a D. C. generator 34 may be located at a suitable place within the frame structure 25, as shown in Figure 1. The output terminals 35 and 36 of said D. C. generator are connected to two longitudinal contact bars 37 and 38 (Figure 6) that are suitably supported from the trolley 20 in vertically spaced parallel relation above the bars 31 (Figure 5). The aforementioned magnetizing windings 32 are identically connected in parallel across said contact bars as can be seen from Figures 3 and 5. A switch 39 located at the right hand end of the machine, as shown in Figure 1, is arranged upon closure to start the motor of the D. C. generator 34 and cause direct current of a suitable voltage such as 28 volts to flow in the same direction through each of the windings 32 and in this manner magnetizes all the bars 31 mounted in the trolley 20.

Arranged below the right hand end of the track 22, 23 is a hydraulic elevator 40, as best shown in Figure 5. Said elevator comprises a pedestal 41 located at the bottom of a concrete-walled pit 42 and mounted upon said pedestal is an upright cylinder 43. Slidably disposed within said cylinder is a piston 44 from which rises a vertical plunger shaft 45 and mounted upon the upper end of said shaft is a horizontal table or platform 46 which is arranged to be flush with the ground whenever the piston 44 is in its lower-most position, as shown in Figure 5. To raise the table 46 above the ground a motor 48, located at a suitable place within the frame structure 25, as shown in Figure 1, is arranged to operate a pump 49. Said pump in turn is arranged to draw a suitable liquid such as oil from a reservoir 50 and deliver it into a control valve 51 which may be set to direct said liquid through a conduit 52 into the interior of the hydraulic cylinder 40 at the lower end thereof, as shown in Figure 5. When liquid is pumped into said cylinder below the piston 44, said piston is forced upwardly and raises the table 46, and any liquid within the cylinder above the piston 44 may escape through a conduit 53 provided at the upper end of said cylinder. Said conduit 53 leads to the aforementioned control valve 51 which is of such construction that it directs said escaping liquid into the reservoir 50 whenever it is set to connect the output end of pump 49 to the space below the piston 44. When the table is to be lowered, the control valve 51 is set to direct the output of the pump 49 through the conduit 53 into the space above the piston 44, and when set in this manner connects the lower conduit 52 automatically to the reservoir 50, so that the liquid contained in the cylinder below the piston 44 may escape and thus permit the table 46 to drop to lower levels. In addition the valve 51 has an intermediate position in which it causes the liquid discharged from the pump 44 to return directly to the reservoir 50, without directly affecting the position of the table 46. Valves of this type are in themselves well known in the art and are readily available on the market, so that it is not necessary to describe their internal construction in greater detail.

To operate the described hydraulic mechanism an electric switch 55 preferably located adjacent to the above described magnet-control switch 39 (Figure 1) is arranged, upon closure, to start the motor 48 which remains continuously in operation as long as the machine is in use; and the flow control valve 51 is operatively connected through a suitable train of links and levers, collectively identified by the reference numeral 56, to an operating handle 57 located at the right hand end of the machine.

Figure 6:
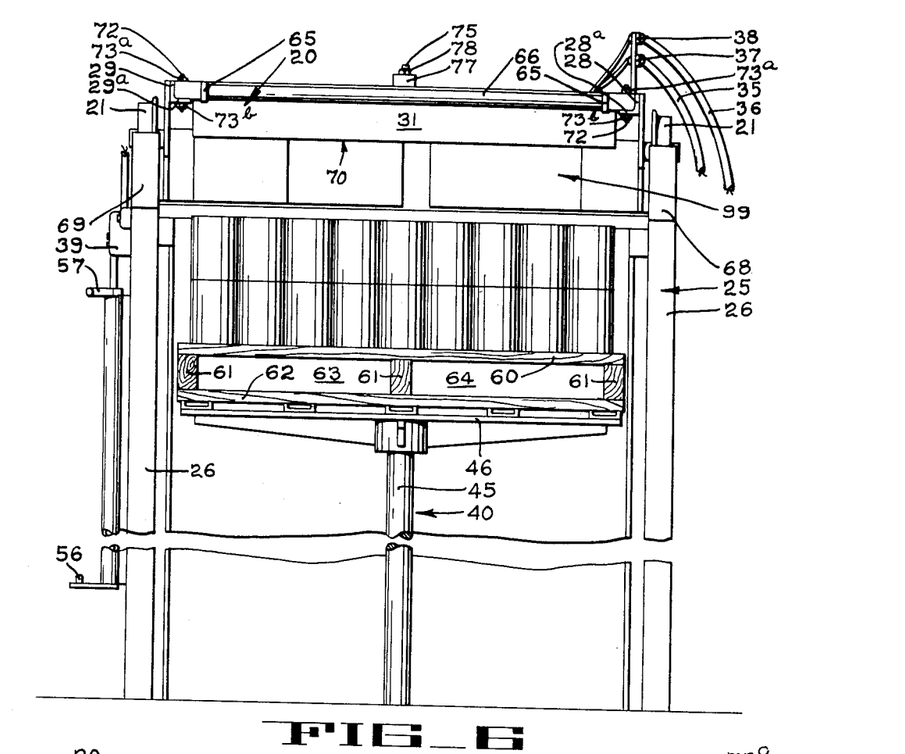
Figure 6 is an end view of the machine viewed from the feed end thereof.
Figure 8:
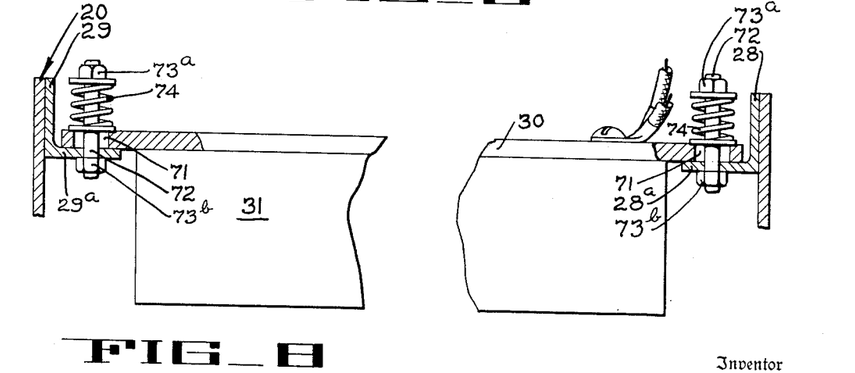

The pallets used for stacking cans are usually composed of an upper horizontally-positioned board 60 which is secured to a plurality of parallel fillets 61 that in turn rest upon a base board 62, as shown in Figure 6, the arrangement being usually such that the fillets 61 divide the interstice between the parallel boards 60 or 62 into at least two parallel spaces 63 and 64 that are accessible from the same side.

When a stack of cans supported upon a pallet is to be dismounted by the machine of the invention the operator sets the hydraulic table 46 by appropriate manipulation of the valve control lever 57 to its lower-most position, wherein it is flush with the ground. He then transfers the loaded pallet from its place of storage onto said table. For this purpose he may use a truck (not shown) provided with a two-pronged fork which is inserted into the above described spaces 63 and 64 of the pallet and which may be raised or lowered, as the case may be, to lift the loaded pallet from a high place of storage and deposit it on to the lowered table 46. With the loaded pallet deposited upon said table, the trolley 20 is moved into a position directly above said table. To facilitate movement of said trolley on its track 22, 23 its right hand end, as viewed in Figures 1 and 5, possesses a pair of rearwardly extending arms 65 which support a transversely positioned push rod 66. To prevent that the trolley 20 may roll too far in rearward direction, the right hand ends of the rails 22, 23 are provided with suitable stop members 68 and 69, respectively.

With the trolley 20 properly positioned above the table 46 the operator switches on the D. C. generator 34 to activate the magnets 31 and manipulates the flow control handle 57 to raise the table 46 until the uppermost layer of the stack of cans placed thereon contacts or at least approaches closely the downwardly directed surface 70 of the magnetic structure formed by the bars 31. The hydraulic table 46 may then be operated to drop to a slightly lower level which withdraws all but the uppermost layer of cans from the magnetic surface 70. The uppermost layer of cans however which had penetrated into intense spheres of the magnetic field formed between the ends of the flanges 31a, 31b and 31c remains suspended from said surface 70 and may now be moved away from above the remaining stack of cans by pushing the trolley 20 forwardly along its track 22, 23.

Figures 10, 11:
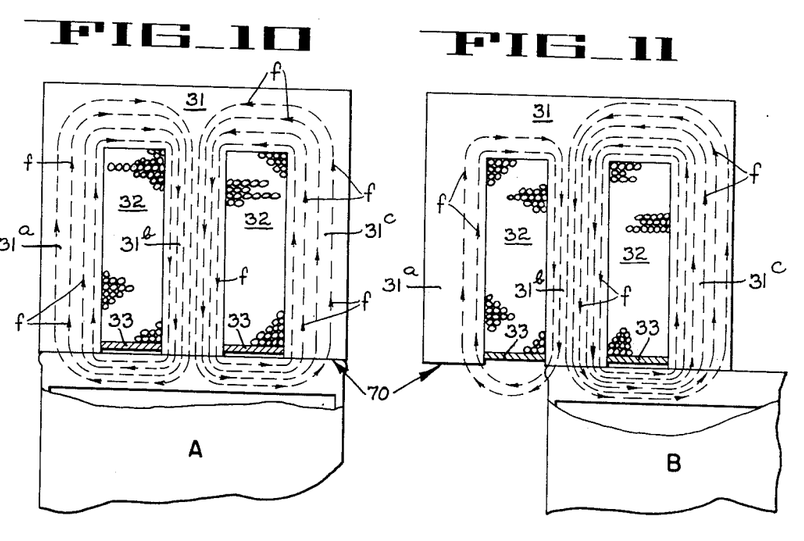
Figures 10, 11 and 12 are detail views illustrating by way of vertical cross sections the manner in which the cans shown in Figure 9 are joined into and affect the magnetic field established by said bars.
Figure 12:
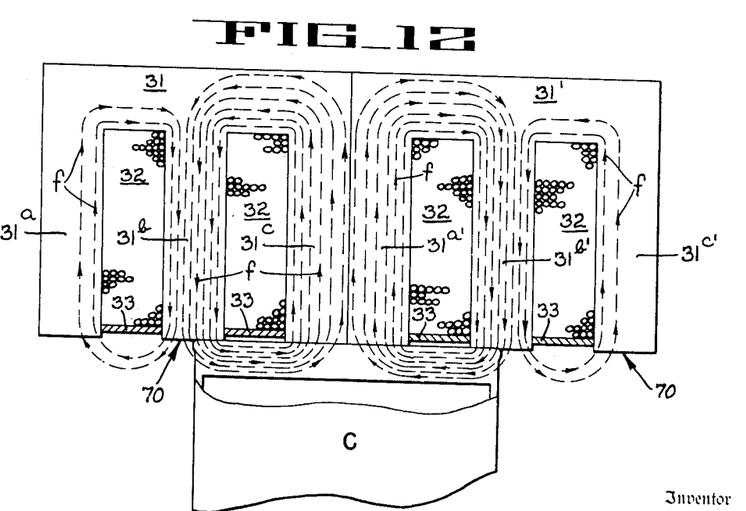

Due to the peculiar conformation of the magnetic bars 31, which have the cross-sectional profile of a downwardly directed E as previously explained, there are no regions in the magnetic surface presented to the cans that are not fully capable of attracting and holding the cans, and it is therefore unnecessary to align the individual can rows of a can stack vertically with the individual bars 31 of the magnetic structure to avoid failures. Having reference to Figure 9, a can A that is vertically aligned with respect to a magnetic bar 31 so that it spans said bar from one of its outer flanges to the other, forms symmetrical low reluctance paths for the magnetic flux in either direction from the center flange 31b to the side flanges 31a and 31c. Hence, the magnetic flux issuing from the center flange 31b of the magnetic bar 31 divides itself into two equal halves both of which return through the can A to the outer flanges 31a and 31c, respectively, as indicated by the arrows f in Figure 10, which illustrates the top wall of the can as of exaggerated thickness for reasons of clarity. The can is therefore strongly attracted by the magnetic bar 31. However, even if a can is so positioned relative to a magnetic bar that it overlaps said bar only partially, as demonstrated by the can B in Figure 9, the can is nevertheless attracted with practically the same force as the can A, because by far the major portion of the magnetic flux issuing from the center flange 31b returns through the low reluctance path constituted by the can to the right hand side flange 31c with only a limited number of the force lines leaking through the open air gap between the can and the left hand side flange 31a of the bar as shown in Figure 11. Finally, if a can should happen to partially overlie two adjacent magnetic bars, as shown at C in Figure 9, said can establishes low reluctance paths from the center flanges 31b and 31b' of the two bars to their adjacently positioned flanges 31c and 31a', respectively, through which the major portions of the magnetic fluxes issuing from the two center flanges 31b and 31b' will return to the magnetic structure in aiding relation, with only a limited amount of leakage occurring through the open air gaps between said center flanges 31b, 31b' and the outer side flanges 31a and 31c', respectively, as illustrated in Figure 12. Hence, the can C will be attracted and held against the magnetic surface formed by said bars 31, 31' with even greater force than if the can had been properly aligned below a magnetic bar in the manner illustrated by the can A.

The upper ends of stacked cans will rarely lie in precisely the same horizontal plane; more frequently a good many of the cans will be slightly tilted in different directions and to different degrees. Hence, when a stack of cans is raised into contact with the lower surface 70 of the magnetic structure formed by the bars 31 some cans may not fully contact said surface with their upper rims and may therefore drop from the magnetic structure when the hydraulic table 46 is lowered. Such "lost" cans drop upon the remaining stack of cans underneath from where they must be manually removed before the stack may again be raised into contact with the magnetic surface to lift another layer therefrom. To avoid such time- and labor-consuming accidents I support the magnetic bars 31 in such a manner from the trolley 20 that they may yield individually in vertical direction or tilt so as to establish fullest contact between the cans and the magnetic structure.

Having reference to Figures 7 and 8, the ends of the carrier members 30 are provided with elongated slots 71 that are loosely engaged by vertical studs 72 which extend through suitable apertures in the flanges 28a and 29a upon which the carrier members 30 are supported. The top and bottom ends of each of said studs are provided with suitable retaining elements such as the nuts 73a and 73b and a compression spring 74 coiled around the stud 72 between the upper retaining member 73a and the upper surface of the carrier member 30 urges said carrier member against the supporting flanges 28a and 29a but permits said member to yield resiliently in upward direction whenever sufficient force is applied from below against the bar 31 to overcome the weight of the assembly 30, 31 and the force of the compression spring 74. Also, due to the elongated shape of the slots 71, each of the bars 31 may tilt about an axis extending longitudinally of the trolley 20 whenever greater force is applied to one of its ends than to the other.

Figure 3:
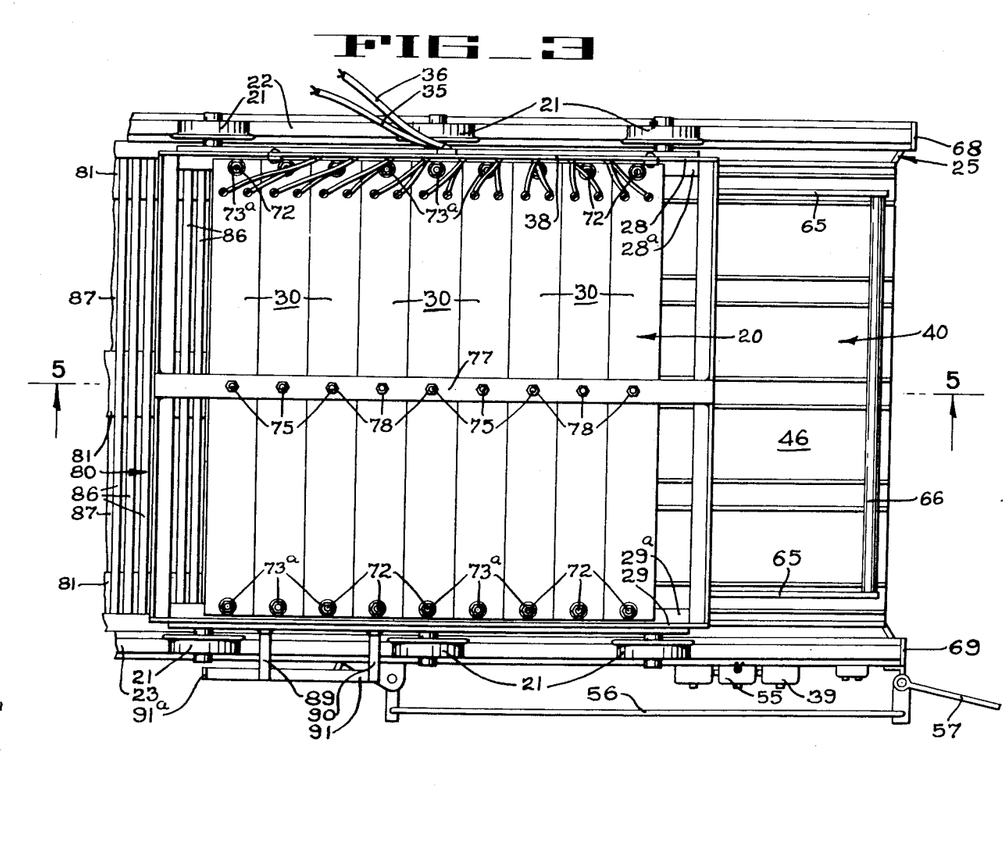

The center areas of the magnetic bars 31 may similarly be supported in such a manner that they may yield in upward direction. Having reference to Figure 5, studs 75 may be suitably anchored with their lower ends within the center portions of the magnetic bars 31 such as by means of screw threads. The upper ends of said studs are arranged to extend loosely through apertures 76 provided in a beam 77 that is supported from the trolley 20 and extends longitudinally of said trolley above the centers of the magnetic bars 31 and their carrier members 30, as shown in Figure 3. Suitable retainer elements, such as the nuts 78, may be arranged on the upper projecting ends of said studs 75, and compression springs 79 coiled around said studs 75 and interposed between the bottom surface of said beam 77 and the top surfaces of the individual carrier members 30 resiliently hold each of the magnetic bars individually in positions in which their ends bear against the aforementioned supporting flanges 28a and 29a, respectively. Thus, when a layer of cans is pressed against the surface of the magnetic structure formed by the bars 31; said bars will adjust themselves to irregularities in the top surface of said can layer so that the top rim of each can may be contacted by the magnetic bars 31 to the fullest possible extent, and may thus be attracted by said bars with a maximum of force.

Figure 2:
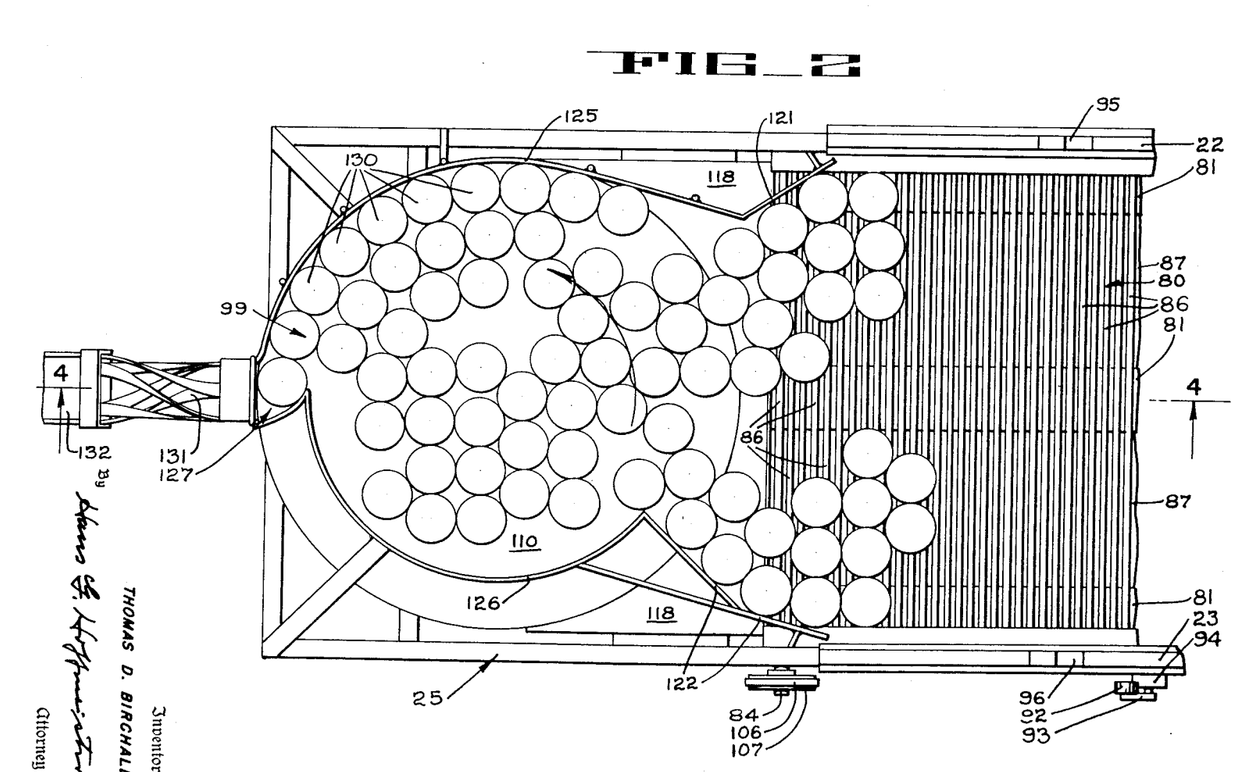

With a layer of cans held by the forces of electromagnetism against the surface 70, and the elevator table 46 dropped to a slightly lower level to disengage said uppermost can layer reliably from the can layer on which it rested before, the trolley 20 may now be pushed forward on its rails to position the attracted layer of cans above a suitable conveyor 80. Having reference to Figures 2 and 4, said conveyor comprises an endless belt 81 trained about rearwardly and forwardly positioned rollers 82 and 83 that are firmly mounted upon transverse shafts 84 and 85, respectively, which are suitably journaled in the machine frame 25. The conveyor belt 81 may be reinforced by an endless sequence of adjacently positioned transverse slats 86 secured to its outer surface and its upper run may be supported by a horizontal panel 87 which in turn is carried by the machine frame 25. When the trolley 20 with a load of cans depending from the magnetic surface 70, is properly positioned above the described conveyor 80, the magnets 31—32 are de-energized, and hence release the cans which drop in upright position upon the upper horizontal rim of the conveyor underneath. While the operator may secure release of the cans by simply opening the previously mentioned switch 39 to stop operation of the D. C. generator 34 I prefer to provide means which are automatically effective to interrupt the direct current supply to the magnetizing windings 32 whenever the trolley 20 has reached a position in which its magnetic surface 70 is situated fully above the conveyor 80. For this purpose the trolley 20 possesses a pair of laterally projecting arms 89 and 90 to which is secured a horizontal runner 91 that has an upwardly curved front end 91a, as shown in Figures 1 and 3. Located in the path of said runner is a roller 92 that is pivoted to the actuating arm 93 of a control switch 94. Said switch is interposed in the circuit which connects the terminals of the D. C. generator 34 to the contact bars 37, 38, and its above mentioned actuating arm 93 is resiliently held in a position in which the switch is closed. However, when the trolley 20 is moved sufficiently far in forward direction to be fully above the conveyor 80, the up-turned front end 91a of the runner 91 engages the roller 92 and depresses the arm 93 which opens the switch 94. As a result thereof the power circuit of the magnets 31—32 is interrupted and the cans transported by the trolley are released. Suitable brake blocks 95 and 96 may be mounted upon the rails 22 and 23, respectively, to positively stop further advance of the trolley, once its magnets have been de-energized by actuation of the lever arm 93 so that the trolley 20 may remain within easy reach of the operator attending to the elevator 40. Whenever the operator pulls the trolley back in the direction of the elevator 40, the runner 91 releases the switch arm 93 permitting the switch 94 to close, which re-energizes the magnets 31. Hence, the magnetic surface 70 is ready to attract another layer of cans whenever the trolley is returned to its initial position above the hydraulic table 46.

During performance of the machine the conveyor 80 is continuously moved in counter-clockwise direction, as viewed in Figure 1, to move the mass of cans deposited upon its upper run onto a can unscrambler mechanism 99 that is adapted to align said cans into a single file column as will be presently described. For operating the conveyor 80 a motor 100 may be located within the frame structure 25, as shown in Figure 1. The output shaft of said motor is operatively connected by a belt 101 with a pulley 102 that is firmly mounted upon a transverse shaft 103 which is rotatably supported from the machine frame 25. Keyed to said shaft exteriorly of the machine frame is another pulley 105 around which is trained a belt 106 that transmits rotary motion from the pulley 105 to another pulley 107. Said pulley 107 is firmly mounted upon the outwardly projecting end of the previously mentioned transverse shaft 84 which carries the conveyor roller 82.

Figure 4:
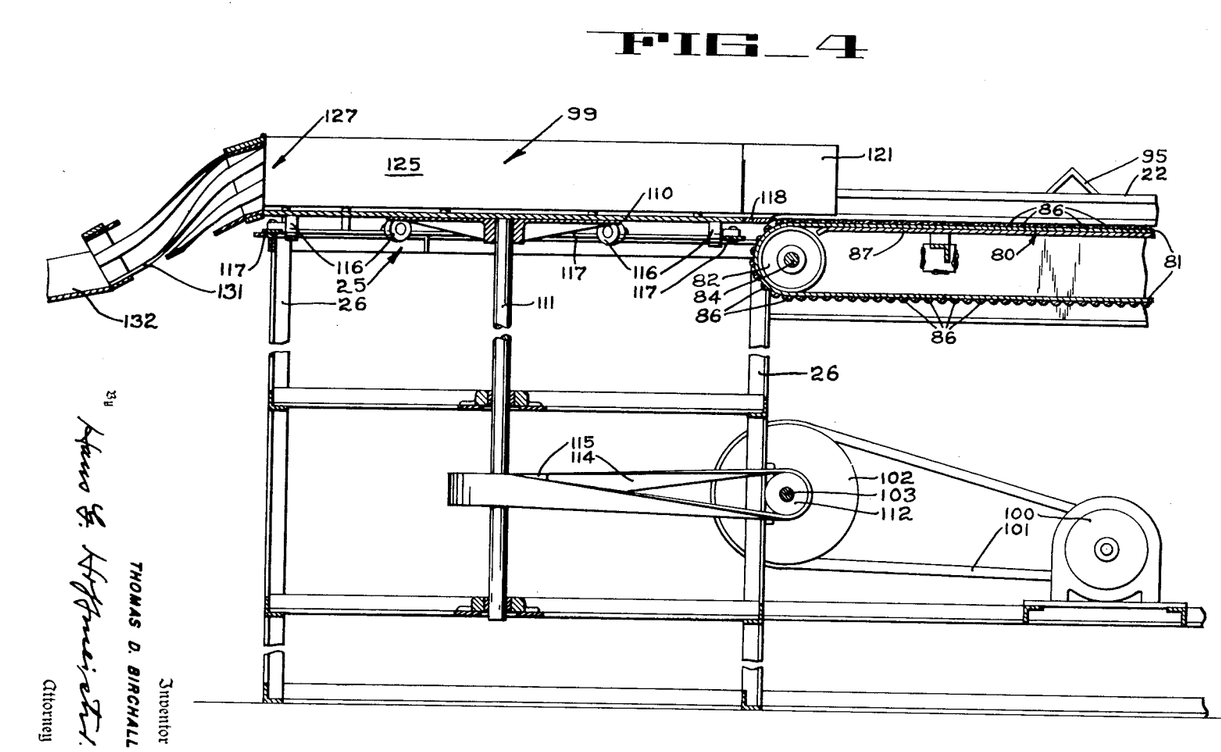

The conveyor 80 carries the cans deposited thereon in upright condition on to a can unscrambling mechanism 99 as previously pointed out. Having reference to Figures 2 and 4, said unscrambling mechanism 99 comprises a circular disc or table 110 disposed adjacently to the discharge end of the conveyor 80 and mounted upon a vertical shaft 111 that is suitably journaled in the machine frame 25. Whenever the conveyor 80 is in operation, the disc 110 is rapidly turned in counterclockwise direction, as viewed in Figure 2. For this purpose a small pulley 112 is keyed to the aforementioned transverse shaft 103 in the power train of the conveyor 80 and trained around said pulley 112 is a belt 114 that transmits rotary motion from the small pulley 112 to a large pulley 115 which is keyed to the disc shaft 111. For smooth operation the disc 110 is arranged to run upon a plurality of rollers 116 pivotally supported in angularly equi-spaced relation from an annular flange 117 which is suitably mounted in the machine frame 25 below the disc 110, as best shown in Figure 4. A suitable ramp plate 118 is provided to bridge the gap between the rectilinear end of the conveyor 80 and arcuate edge of the adjacent disc segment, and converging guide walls 121 and 122, respectively, funnel the cans supplied by said conveyor onto said rotating disc 110. The right or counter-clockwise segment of the rotating disc 110, as viewed in the direction of the movement of the cans (Figure 2), is bounded by an arcuate guide panel 125 which is situated slightly above said disc and follows the outer edge thereof and which may be formed by an appropriately shaped extension of the aforementioned right hand guide wall 121. Disposed above the left or clockwise segment of said disc 110 is another arcuate guide panel 126 which may be supported from and forms a continuation of the aforementioned left hand guide wall 122 and which has a lesser radius than the first mentioned guide panel 125 by a distance equal to the diameter of a can. Thus, at the point where said arcuate guide panels 125 and 126 come into angular alignment an outlet 127 is formed which is so dimensioned as to pass a single file column of the cans to be processed in the machine of the invention. Cans delivered onto the rotating disc 110 are caused by centrifugal action to slide toward the periphery of said disc. As they come against the above described arcuate guide panel 125, the rotary motion of the disc 110 impels them to slide along said panel in counter-clockwise direction and thus arrange themselves in an arcuate counter-clockwise moving single file row, as shown at 130 in Figure 4, that advances to and may escape through the above described outlet 127. Said outlet 127 may lead to a suitable conveyor adapted to transport the cans in upright position to a processing machine such as a labeler (not shown) or it may be connected to a twister shoot 131 which lays the cans on their sides permitting the use of an inclined gravity chute 132 through which they may roll to said labeling machine.

The described machine enables a single operator to dismount stacks of cans at a rapid rate and to arrange the cans into an orderly single file row without requiring any manual handling of said cans whatsoever.

While I have explained my invention with the aid of an exemplary embodiment thereof, it will be understood that I do not wish to be limited to the specific constructional details shown or illustrated which may be departed from without departing from the scope and spirit of my invention.

Having thus described my invention and the manner in which it is to be formed, what I claim is:

1. In a machine for unpiling a stack of cans, a cart for transporting layers of cans and like articles comprising a plurality of adjacently positioned horizontal bars of magnetizable material and of a cross sectional contour in the form of a downwardly directed E each having a pair of lateral flanges and a center flange, magnetizing windings arranged longitudinally around said center flange, and means for presenting the uppermost layer of a stack of cans to the ends of said flanges.

2. In a machine for unpiling a stack of cans, a vehicle for transporting a layer of cans and like articles comprising a plurality of adjacently positioned longitudinal bars of a magnetizable material each having the cross-sectional contour of an E being provided with one centrally and two laterally positioned downwardly directed longitudinal flanges, magnetizing windings arranged around all of said centrally positioned flanges, means mounting said bars resiliently within a common horizontal plane, each bar being mounted for movement individually upwardly out of said plane, and means for presenting the uppermost layer of a stack of cans to said bars with sufficient force to displace individual bars against the resiliency of said support means.

3. In a machine for unpiling a stack of cans, a magnetic structure for attracting layers of cans and like articles comprising a plurality of adjacently positioned bars of a magnetizable material, each having the cross-sectional contour of an E being provided with a pair of downwardly directed lateral flanges and a downwardly directed center flange, magnetizing windings arranged longitudinally around the center flanges of each of said bars, and means for presenting the uppermost layer of a stack of cans to the lower ends of the lateral and central flanges of said bars.

4. In a machine for unpiling a stack of cans, a magnetic structure for attracting layers of cans and like articles, comprising a plurality of adjacently positioned bars of a magnetizable material each having the cross-sectional contour of a downwardly directed E being provided with one centrally and two laterally positioned downwardly directed longitudinal flanges, magnetizing windings arranged longitudinally around the centrally positioned flanges of all of said bars, means resiliently mounting said bars within a common horizontal plane, each bar being mounted for movement individually upwardly out of said plane, and means arranged to elevate a stack of cans upwardly in a direction substantially normal to said horizontal plane to present the uppermost layer of the stack to said magnetizable bars with sufficient force to displace individual bars against the resiliency of said support means.

5. In a machine for unpiling a stack of cans, a transfer member comprising a rigid frame having spaced side members, a plurality of carrier bars having lower surfaces of magnetizable material and extending transversely of said frame between said side members, each bar having opposite end portions loosely positioned on said side members, first resilient means operatively connected to each end portion of each bar and to one of said side members for resisting pivoting movement of each bar transversely of said frame, and second resilient means disposed between the center of each bar and said frame for resisting upward movement of each bar, and means for presenting a layer of cans to said bars with sufficient force to selectively displace individual bars against the resistance of said first and second resilient means to move said bars into position to permit all of the cans to contact said magnetizable lower surfaces.

6. In a machine for unpiling a stack of cans, a transfer member comprising a rigid frame having spaced longitudinal side members and a longitudinal center member, a plurality of carrier bars extending transversely of said frame and having lower surfaces of magnetizable material, each bar extending under said center member and having opposite end portions loosely positioned on said spaced side members, resilient means operatively connected to each end portion of each bar and to one of said side members for resisting upward movement of said end portion, resilient means disposed between said center member and the center portion of each of said bars for resisting upward movement of the center portion of the bar, and means for presenting a layer of cans to said bars with sufficient force to selectively displace individual bars against the resistance of said separate resilient means to move each can into contact with said magnetizable lower surfaces.

7. In a machine for unpiling a stack of cans, a transfer member comprising a rigid frame having spaced side members with flat apertured support surfaces, a plurality of adjacently positioned carrier bars extending between said side members, each bar having a lower surface of magnetizable material and having opposite slotted end portions resting on the support surfaces of said spaced side members, the slot in each end portion being aligned with a mounting hole in one of said support surfaces, a stud extending through each aligned slot and hole, a nut threaded on each end of each stud, a compression spring disposed around each stud between the bar end portion and one of said nuts and arranged to resist upward movement of said end portion, and means for moving a layer of cans upwardly into contact with the magnetizable surfaces of said bars to move each end portion of each bar independently upwardly against the resistance of the associated spring to adjust the position of all of said bars to permit contact of all of said cans with said magnetizable surfaces.

References Cited in the file of this patent

UNITED STATES PATENTS

| | | |
|---|---|---|
| 1,352,948 | Fiske | Sept. 14, 1920 |
| 1,700,443 | Morsa | Jan. 29, 1929 |
| 1,836,444 | Carnahan | Dec. 15, 1931 |
| 1,904,720 | Douglass | Apr. 18, 1933 |
| 2,059,546 | Brandenburg | Nov. 3, 1936 |
| 2,071,859 | Steiner | Feb. 23, 1937 |
| 2,204,207 | Coburn | June 11, 1940 |
| 2,338,048 | Minaker | Dec. 28, 1943 |
| 2,371,128 | Costa | Mar. 13, 1945 |
| 2,393,682 | Hekman | Jan. 29, 1946 |
| 2,431,320 | Fischer | Nov. 25, 1947 |
| 2,452,927 | Hammen | Nov. 2, 1948 |
| 2,466,693 | Fischer | Apr. 12, 1949 |
| 2,565,927 | Morgan | Aug. 28, 1951 |